United States Patent
Reinhart et al.

(10) Patent No.: US 6,585,091 B2
(45) Date of Patent: Jul. 1, 2003

(54) TORSIONAL VIBRATION DAMPER

(75) Inventors: Edgar Reinhart, Hofheim (DE); Dietrich Bechmann, Röthlein (DE); André Meyer, Schweinfurt (DE); Friedrich Schramm, Schonungen-Forst (DE); Christoph Sasse, Schweinfurt (DE); Erwin Wack, Niederwerrn (DE); Jörg Sudau, Niederwerrn (DE)

(73) Assignee: Mannesmann Sachs AG, Schweinfurt (DE)

(*) Notice: Subject to any disclaimer, the term of this patent is extended or adjusted under 35 U.S.C. 154(b) by 14 days.

(21) Appl. No.: 09/827,402

(22) Filed: Apr. 5, 2001

(65) Prior Publication Data

US 2001/0032767 A1 Oct. 25, 2001

(30) Foreign Application Priority Data

Apr. 10, 2000 (DE) .......................................... 100 17 801

(51) Int. Cl.⁷ .............................. F16H 45/02; F16D 3/52
(52) U.S. Cl. ................... 192/3.28; 192/55.51; 192/203; 192/207; 464/59; 464/99
(58) Field of Search .............................. 192/55.51, 207, 192/3.28, 3.29, 203; 464/59, 60, 77, 99; 267/81, 154, 155

(56) References Cited

U.S. PATENT DOCUMENTS

| | | | | |
|---|---|---|---|---|
| 1,008,379 A | * | 11/1911 | Sneeringer | 464/59 |
| 3,759,063 A | * | 9/1973 | Bendall | 464/99 |
| 4,044,628 A | * | 8/1977 | Jacks | 464/59 |
| 4,181,208 A | * | 1/1980 | Davis | 192/207 |
| 4,605,114 A | * | 8/1986 | Goetz et al. | 192/213.1 |
| 4,763,767 A | * | 8/1988 | Lanzarini et al. | 192/204 |
| 4,768,637 A | * | 9/1988 | Bopp et al. | 192/55.51 |
| 4,795,012 A | * | 1/1989 | Durum | 192/207 |
| 5,104,356 A | * | 4/1992 | Paquin et al. | 192/207 |
| 5,147,246 A | * | 9/1992 | Focqueur et al. | 192/207 |
| 5,353,664 A | * | 10/1994 | Yamamoto | 74/573 F |
| 5,538,110 A | * | 7/1996 | Juday et al. | 464/27 |
| 5,653,639 A | * | 8/1997 | Gassmann | 464/24 |
| 5,797,474 A | * | 8/1998 | Nakane et al. | 192/207 |
| 5,908,095 A | * | 6/1999 | Jackel et al. | 192/207 |

FOREIGN PATENT DOCUMENTS

DE  38 09 008 A1  *  9/1989

* cited by examiner

*Primary Examiner*—Rodney H Bonck
(74) *Attorney, Agent, or Firm*—Cohen, Pontani, Lieberman & Pavane

(57) ABSTRACT

A torsional vibration damper for incorporation into the torque transmission path between two components or subassemblies, especially for a hydrodynamic coupling device, includes at least two disk-like damper members. Each damper member has a radially outward coupling region and a radially inward coupling region, and at least one deformation region extending between the radially outward coupling region and the radially inward coupling region. Each deformation region is elastically deformable at least in some areas to permit a relative circumferential movement between the radially outward coupling region and the radially inward coupling region.

15 Claims, 4 Drawing Sheets

TORSIONAL VIBRATION DAMPER

BACKGROUND OF THE INVENTION

1. Field of the Invention

The present invention relates to a torsional vibration damper for incorporation into the torque transmission path between two components or subassemblies, especially for a hydrodynamic coupling device.

2. Description of the Related Art

Such torsional vibration dampers are used, for example, in the torque transmission path between a clutch piston of a lockup clutch arrangement and a turbine wheel, but may also be used in clutch plates or multiple-mass flywheels. Helical springs are generally provided as the damper members to provide the necessary elasticity and can be subjected to the action of respective control regions or control edges of two components or subassemblies that can be twisted relative to one another about an axis of rotation. When torsional vibrations occur as a result of the interaction with the respective control edges, the helical compression springs, whose longitudinal axes extend approximately in the circumferential direction, can be compressed. The two components or subassemblies to be coupled to one another via such helical compression springs generally comprise, as one of the subassemblies, two cover disk members that are connected to one another in a manner fixed in rotation and at an axial distance apart, and as the other of the components or subassemblies a central disk member which engages between the two cover disk members. Such arrangements require a relatively large amount of structural space and, in addition, are subject to the problem that the helical springs, extending approximately in the circumferential direction, are displaced radially outward by centrifugal force in rotating operation and, in doing so, make frictional engagement with at least one of the components. This frequently results, at least at relatively high speeds of rotation, in a disadvantageous effect on damping performance.

SUMMARY OF THE INVENTION

It is an object of the present invention to provide a torsional vibration damper for incorporation into the torque transmission path between two components or subassemblies wherein, with simple construction and reduced structural space requirement, a vibration damping performance that can be little influenced by external influences can be provided.

According to the present invention, this object is achieved by a torsional vibration damper for incorporation into the torque transmission path between two components or subassemblies, especially for a hydrodynamic coupling device, comprising at least two disk-like damper members. Each damper member has a radially outward coupling region and a radially inward coupling region, and at least one deformation region extending between the radially outward coupling region and the radially inward coupling region and capable of elastic deformation at least in some areas to permit a relative circumferential movement between the radially outward coupling region and the radially inward coupling region.

In the torsional vibration damper according to the invention, then, the principle of compressible helical springs or the like is relinquished; instead, deformation regions extending from radially outward to radially inward and capable of deformation are used and introduce the necessary elasticity into the torque transmission path. As, moreover, at least two damper members having such deformation regions are used in the torsional vibration damper according to the invention it is possible, for example, by producing the damper members by stamping technology from sheet metal material, by appropriate selection of the number of damper members or of the material thereof to combine a desired damping performance with ease of manufacture.

For example, it is possible to provide that the at least one deformation region extends between the radially outward coupling region and the radially inward coupling region, at least in some areas, with a circumferential extension direction component. The at least one deformation region may extend spirally, at least in some areas, relative to an axis of rotation.

In order to be able to transmit higher torques without the potential risk of damaging the damper members, it is proposed that at least two deformation regions are provided for at least one damper member. A very strong coupling with the various components or subassemblies can be achieved in that, for at least one damper member, the radially outward coupling region and/or the radially inward coupling region is/are of substantially annular form.

In order to be able to transmit relatively high torques, or to be able to provide a comparatively high spring stiffness, it is proposed that, for all damper members the radially outward coupling region is provided for coupling to a first of the two components or subassemblies and the radially inward coupling region is provided for coupling to the second of the two components or subassemblies. This ultimately means that all damper members are connected in parallel with one another, so that the spring constant provided by their respective deformation regions cumulatively gives an overall spring constant.

Alternatively, it is possible to provide that, for at least one of the damper members, the radially outward coupling region and/or the radially inward coupling region is or are coupled or capable of being coupled to, respectively, a radially outward coupling region and a radially inward coupling region of at least one further damper member. This ultimately means that at least two damper members are connected in series relative to one another, which results in a significantly longer spring travel.

For this purpose the radially outward coupling region or the radially inward coupling region of a damper member can be coupled to a first of the two components or subassemblies, the radially outward coupling region or the radially inward coupling region of another damper member can be coupled to the second of the two components or subassemblies, and the respective other coupling regions of the one damper member and of the other damper member can be connected to one another. In this arrangement, the respective other coupling regions of the one damper member and of the other damper member can be substantially directly connected to one another. As an alternative, however, it is also possible for the respective other coupling regions of the one damper member and of the other damper member to be connected to one another via at least one further damper member.

In the torsional vibration damper according to the invention, at least two of the damper members can be formed from different material and/or produced with different material dimensions and/or provide different damping spring constants and/or are provided in mutually opposite installation positions.

It is also possible for the damper members to be arranged lying one upon the other.

In order to obtain the desired elasticity, the damper members can be formed from spring steel material.

A strong coupling between various of the damper members and the components or subassemblies to be coupled can be achieved in that at least those coupling regions which can be coupled to the first and the second components or subassemblies, respectively, have a toothing-like coupling formation.

The present invention also relates to a hydrodynamic coupling device, especially a hydrodynamic torque converter or fluid clutch wherein a torsional vibration damper according to the present invention is provided in the torque transmission path between a clutch member of a lockup clutch arrangement and a turbine wheel and/or in the torque transmission path between a turbine wheel shell and a turbine wheel hub.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
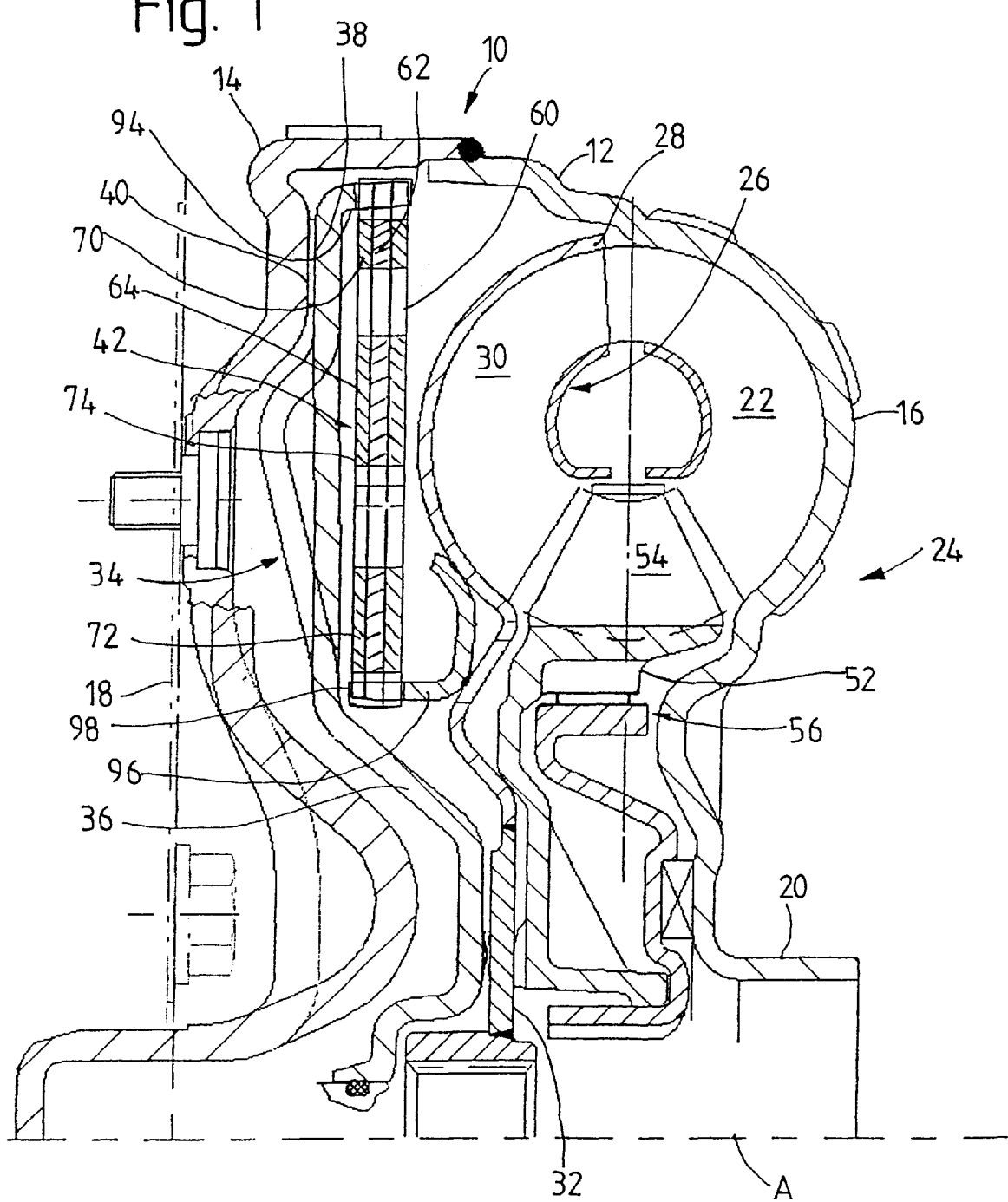
FIG. 1 shows a partial view in longitudinal section of a hydrodynamic torque converter, in which a torsional vibration damper according to the invention is provided.

In FIG. 1, a hydrodynamic torque converter 10 includes a housing arrangement 12, which in turn comprises a housing lid 14 and a pump impeller shell 16 connected thereto in the radially outward region by welding or the like. The housing lid 14 is connected or can be connected via a coupling arrangement 18 to a drive shaft (not shown), in a manner fixed in rotation, and the pump impeller shell 16 is formed in its radially inward region integrally with a pump impeller hub 20. Furthermore, the pump impeller shell 16 carries a plurality of pump impeller blades 22 in its radially outward region, the pump impeller shell 16 with the pump impeller hub 20 integrally formed thereon and the pump impeller blades 22 ultimately forming a pump impeller 24. A turbine wheel 26 is also provided in the interior space of the torque converter 10. This turbine wheel comprises a turbine wheel shell 28, which bears a plurality of turbine wheel blades 30 in its radially outward region and is fixedly connected in its radially inward region to a turbine wheel hub 32. The turbine wheel hub 32 may be coupled to an output shaft, for example a transmission input shaft, for joint rotation.

A stator 52 is situated axially between the turbine wheel 26 and the pump impeller 24. The stator 52 bears a plurality of stator blades 54 on its radially outward region and is supported, via a free-wheel arrangement 56, on a supporting member (not shown), for example a supporting shaft, extending for example coaxially with the pump impeller hub 20. The free-wheel arrangement 56 ensures that the stator 52 with the stator blades 54 carried thereon is freely rotatable in one direction of rotation only but is locked against rotation in the other direction of rotation.

The hydrodynamic torque converter 10 further comprises a lockup clutch arrangement 34. This has a clutch piston 36, which in its radially inward region is guided to be axially movable on the output shaft (not shown) and which in its radially outward region can be pressed, with the interposition of a friction lining 38 or the like, against a counter-friction surface 40 of the housing lid 14. In addition, the clutch piston 36 is fixedly coupled via a torsional vibration damper 42 to the turbine wheel 26 or to an entraining member 44 fixed thereon.

In the embodiment shown in FIG. 1, the torsional vibration damper 42 has a plurality of disk-like damper members 60, 62, 64. These three disk-like damper members 60, 62, 64 are shown in axial view in FIG. 2. It can be seen that the torsional vibration damper 42 comprising the disk-like damper members 60, 62, 64 is of annular form relative to the axis of rotation A and comprises an outer continuous annular region 66 and an inner continuous annular region 68. Between these two annular regions 66, 68, which, as described below, form respective coupling regions 70, 72, respective deformation sections 74, 76 extend. In the radially outward end region 78, 80, these deformation sections 74, 76 adjoin the radially outward annular region 66, in other words the radially outward coupling region 70. In their radially inward end region 82, 84 these deformation sections 74, 76 adjoin the radially inward annular region 68, in other words the radially inward coupling region 72. These deformation regions 74, 76 are configured as spiral arms which extend both in the radial direction and in the circumferential direction, and are arranged offset to one another in the circumferential direction by 180°.

The individual damper members 60, 62, 64 are produced, for example, by punching from spring steel material so that, as a result of elastic deformation of the deformation regions 74, 76, a relative rotation within a limited angular range is possible between the radially outward annular region 66 and the radially inward annular region 68. This is also supported by the visible configuration of the deformation regions 74, 76, which are thicker, in other words have a greater width, in their respective end regions 82, 84 and 78, 80, respectively, than in the intermediate central regions 86, 88.

In the coupling regions 70, 72, the damper members 60, 62, 64 each have toothed or projecting configurations 90 and 92 respectively. Correspondingly, a substantially axially extending projecting or toothed configuration 94 is formed in the radially outward region on the clutch piston 38, and in the same way a substantially axially extending projecting or toothed configuration 98 is provided on an entraining member 96, which is fixedly connected to the turbine wheel shell 28, for example by welding. When moved together axially, the projecting or toothed configurations 90 and 94 engage one into the other in the circumferential direction, substantially without play, and the toothed configurations or projecting configurations 98 and 92 engage one into the other in the circumferential direction, substantially without torsional play. In this manner, the damper members 60, 62, 64 form, in other words ultimately the torsional vibration damper 42 forms, a torque transmission connection between the clutch piston 38 and the turbine wheel 28, in which however a certain elasticity of movement is permitted to allow a relative circumferential movement between the clutch piston 36 and the turbine wheel 26.

Figure 3:
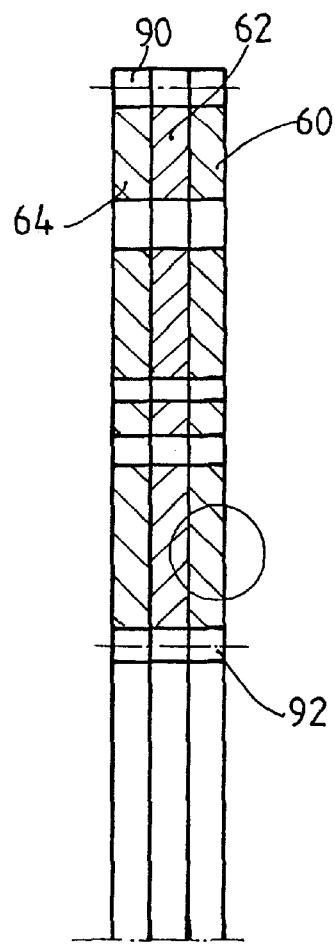
FIG. 3 shows an enlarged partial lateral view of the torsional vibration damper used in the torque converter according to FIG. 1.
Figure 4:
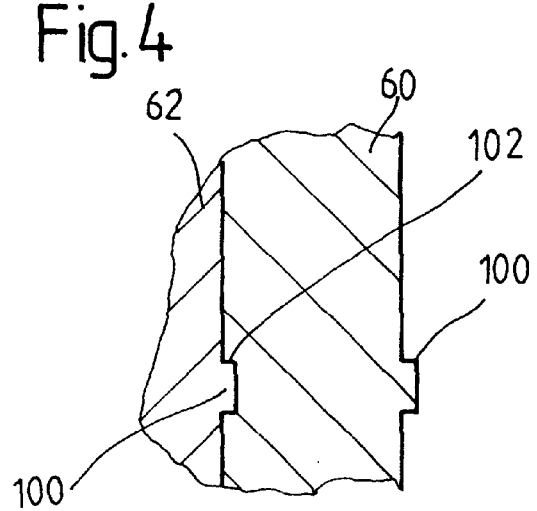
FIG. 4 enlarges the circled detail of FIG. 3.

As can be seen in the illustration according to FIG. 1, all radially outward coupling regions 70 of the damper members 60, 62, 64 are coupled to the clutch piston 36 in a manner fixed in rotation, Correspondingly, all radially inward coupling regions 72 of the damper members 60, 62, 64 are coupled to the entraining member 96, and hence to the turbine wheel 26, in a manner fixed in rotation. Thus the individual damper members 60, 62, 64 are here connected in parallel, so that their individual elasticity constants or spring constants are cumulative and a correspondingly rigid or more rigid damping characteristic can be obtained. In this configuration, as shown in FIGS. 3 and 4, in order to facilitate assembly, the individual damper members 60, 62, 64 are fixedly connected to one another, for example by the forming of protuberances 100 which then engage into respective recesses 102 of a directly adjoining damper member. In principle, it would also be conceivable here for the damper members 60, 62, 64 to be welded or adhesively bonded. In this manner, ultimately, a configuration could also be produced in which a toothed or projecting configuration 90 or 92 is provided only in the case of one single damper member 60, 62 or 64, while the other damper members are then merely formed in their respective coupling regions for direct coupling to a further damper member. For reasons of strength, however, the configuration shown in FIG. 1 is preferred.

Figure 2:
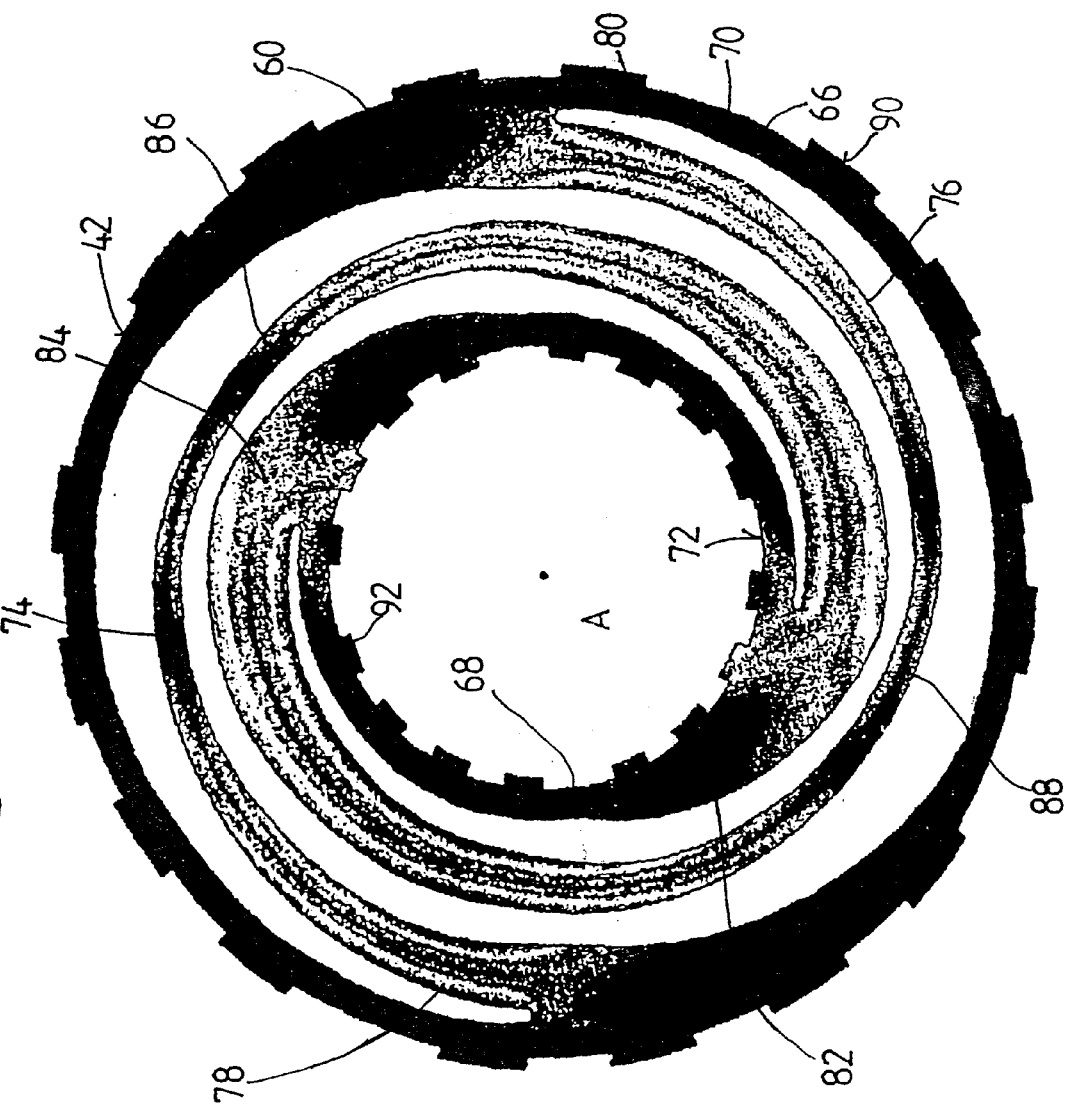
FIG. 2 shows an axial view of the torsional vibration damper used in FIG. 1.

For the purpose of setting different damping performances or spring constants, it is possible, for example, to use damper members 60, 62, 64 that have different dimensions, being formed for example from spring steel members of different thicknesses, or wherein the deformation regions 74, 76 are also differently configured or different numbers of deformation regions are provided. It is also possible, especially in order to obtain a damping performance that is equal in both directions of rotation, to select different installation positions of the damper members 60, 62, 64. If, for example, the damper member 60 is installed as shown in FIG. 2, in other words, for example, the deformation regions 74, 76, starting from the radially inward annular region 68, extend counterclockwise when viewed from an axial side, a precisely rotated installation position could be selected for another or a plurality of other damper members in which the deformation regions then extend, starting from the radially outward and radially inward annular regions 66, 68 respectively, in the opposite circumferential direction.

Figure 5:
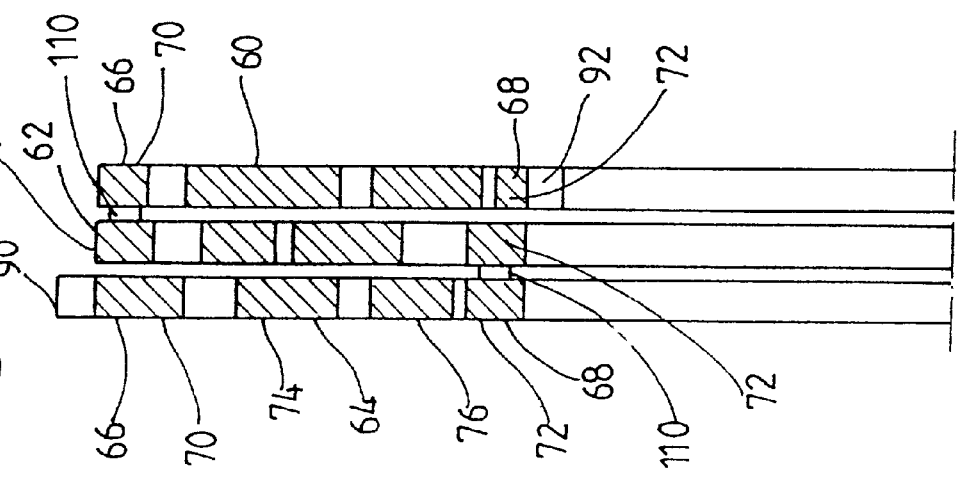
FIG. 5 shows a lateral view of an alternative type of embodiment of the torsional vibration damper according to the invention.

In the alternative embodiment according to FIG. 5, the individual damper members 60, 62, 64 are connected in series. In the damper member 64 located on the far left, i.e. that damper member lying closest to the clutch piston 36, although a toothed or projecting configuration 90 is provided on the radially outward annular region 66, i.e. the radially outward coupling region 70, none is provided on the radially inward annular region 68, i.e. the radially inward coupling region 72. The latter is in this case fixedly connected, for example by a rivet connection 110 or the like, with the radially inward coupling region 72 of the immediately following damper member 62. No toothed configuration or the like is provided on this radially inward coupling region 72 of the damper member 62. The radially outward coupling region 70 of the damper member 62 is fixedly connected via a rivet connection 110 or the like to the radially outward coupling region 70 of the damper member 60. The two damper members 62 and 60 likewise have no toothed or projecting configuration in their radially outward coupling regions 70. The radially inward coupling region 72 of the damper member 60 located on the far right, i.e. the damper member 60 lying closest to the turbine wheel 26, has the radially inward facing or projecting toothed configuration 92 which is formed to provide a connection with the entraining member 96 that is fixed in rotation.

As a result of such a series connection of the individual damper members 60, 62, 64, a very elastic damper is ultimately provided and, as a result of the cumulative effect of the springs or torsion paths of all three damper members 60, 62, 64, provides a relatively large damping travel.

In such an embodiment it is again possible to form the damper members 60, 62, 64 with different damping performances, in order for example to achieve a multistep damping performance. Thus, for example, the two damper members 60, 64 could be formed with greater rigidity, in other words greater spring constants, than the damper member 62. In torque transmission operation, the damper member 62 is then deformed first and only then, after its admissible or possible deformation travel has been fully utilized, are the more rigid damper members 60, 64 substantially deformed. Also, in an arrangement of this type, it is again possible to provide the different damper members in installation positions opposite to one another, in order to be able to provide an equal damping performance in both possible directions of torque transmission.

The alternative embodiments shown in FIGS. 3 and 5 can be combined. For example, it would be possible to connect respective packs of damper members in series, i.e. the radially outward coupling regions of a first pack could be coupled to the clutch piston in a manner fixed in rotation, and the radially inward coupling regions of a further pack could be coupled to the turbine wheel 26 in a manner fixed in rotation. A further pack, or optionally only a single damper member, could lie between these two packs and be coupled by its radially outward coupling region to the pack that is connected radially inwardly to the turbine wheel 26, and be coupled by its radially inward coupling region to the pack that is connected radially outwardly to the clutch piston.

Figure 6:
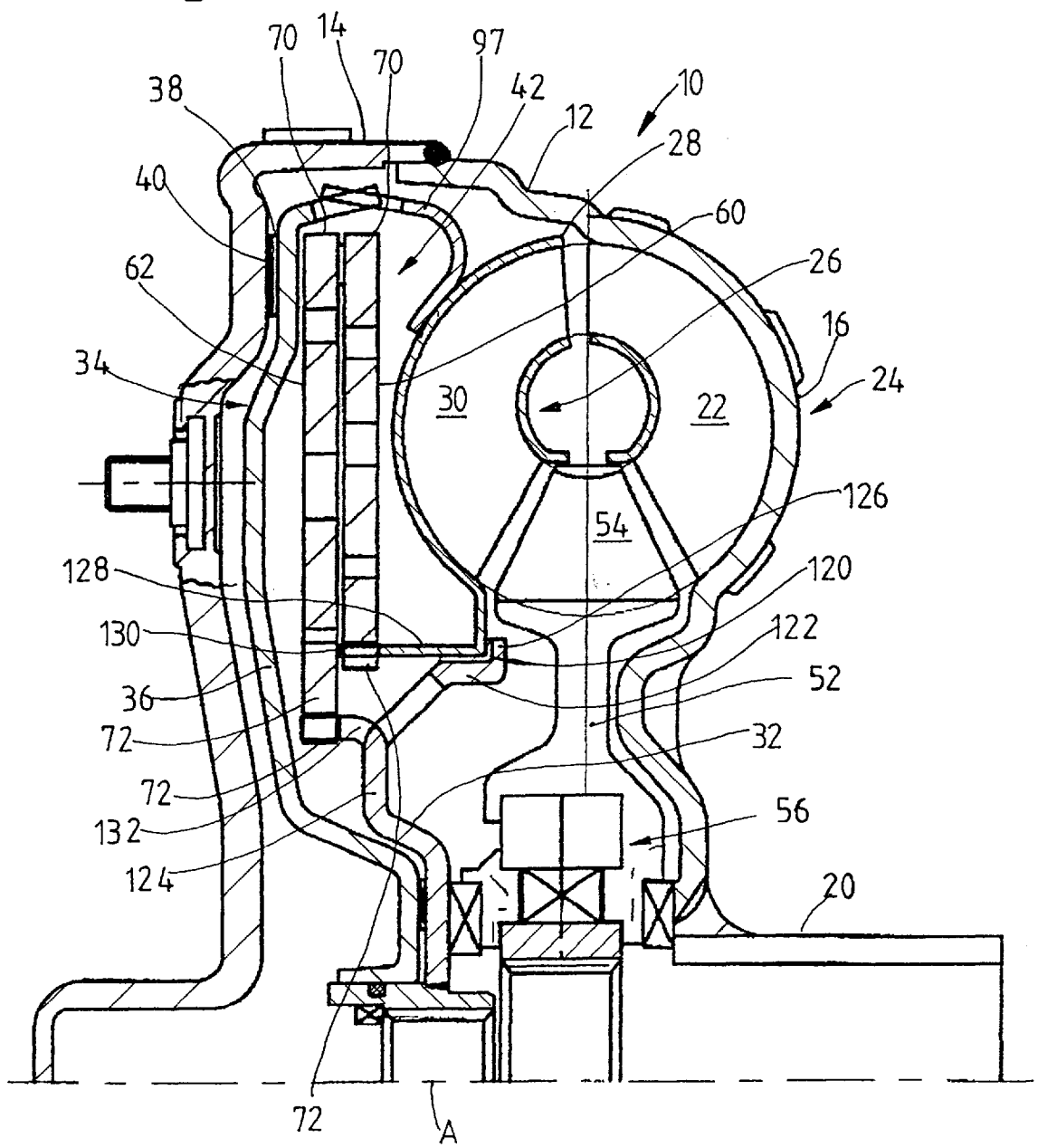
FIG. 6 shows a view corresponding to FIG. 1, in which a further alternative type of embodiment of a torsional vibration damper according to the invention is shown.

In the embodiment shown in FIG. 6, the torsional vibration damper 42 does not lie in the torque transmission path between the clutch piston 36 and the turbine wheel 26, but lies in the torque transmission path between the turbine wheel shell 28 and the turbine wheel hub 32. The clutch piston 36 is coupled to the turbine wheel shell via an entraining member 97 in a manner fixed in rotation. In this case, the turbine wheel shell 28 is rotatably mounted by its radially inward region, for example with the interposition of a slip bearing material 120, on a radially outward bearing region 122 of a flange section 124 of the turbine wheel hub 32. A radial projection 126 is provided on the bearing section 122 which provides a fixing of the turbine wheel shell 28 in an axial direction toward the pump impeller 24. A cylindrical section 128 is provided radially inwardly on the turbine wheel shell 28 and is either formed by a plurality of axially extending projections 130 or has such projections 130 at least in its axial end region. A plurality of projections 132 extending approximately in the axial direction are also bent down from the flange-like section 124 of the turbine wheel hub 32. These projections 130, 132 couple the turbine wheel shell 28 and the turbine wheel hub 32 to respective coupling regions 72 of the two damper members 60, 62 in a manner fixed in rotation. The damper members 60, 62 are connected to one another in their radially outward coupling regions 70 in a manner fixed in rotation, for example by riveting or the like.

Here again, then, a torsional vibration damper 42 is provided in which the damper members 60, 62 are connected in series with one another, so that a relatively great torsional travel is provided.

In this type of configuration also, more than two damper members 60, 62 could be provided, which would be coupled in series with one another, for example four or six such damper members. It would also be possible for respective packs of damper members to be connected in series with one another.

The present invention provides a torsional vibration damper which, while being of simple design and simple to manufacture, provides reliable elastic damping. As a result of the shaping of the various deformation regions, a particular damping performance can be changed or predetermined in a very simple manner. The torsional vibration damper according to the invention takes up relatively little structural space and is therefore particularly suitable for incorporation into hydrodynamic coupling devices, such as the torque converter illustrated, but can also be used for clutch plates or multiple-mass flywheels.

The composition of the torsional vibration damper 42 from a plurality of disk-like damper members makes it possible to design such a torsional vibration damper also to transmit relatively high torques, production by punching methods using relatively thin individual sheet metal materials also being possible. Furthermore, as a result of the use of a plurality of damper members, a stepwise damper performance can also be provided in a simple manner and a relatively long spring travel can be achieved, especially if a soft or elastic damping performance is to be provided.

It is further pointed out that the damper members to be assembled or coupled to one another according to the invention to form a torsional vibration damper need not necessarily have their respective coupling regions formed as annular regions, although this is advantageous for the purposes of uniform force transmission in particular where coupling to other components, for example the clutch piston or turbine wheel, is envisaged. Fundamentally, however, it would also be conceivable for the respective deformation regions in the radially outward or radially inward end regions to be connected by screwing, riveting, welding or the like to one of the components to be coupled. Especially in the series positioning or connection of the individual damper members, it is also possible to achieve the coupling between individual damper members or between the individual deformation regions thereof by connection in the radially outward and radially inward deformation regions. The mass moment of inertia introduced by such an arrangement of damper members can thus be reduced, since ultimately the annular regions can be at least partially omitted. With regard to facilitating the assembly operation, however, it is advantageous, for example, to connect the plurality of deformation regions of each damper member fixedly or integrally to one another by means of the annular regions shown in the figures. For the purposes of the present invention, however, a damper member may also comprise a plurality of deformation regions which, ultimately, are not fixedly coupled or connected to one another via such annular regions but have radially outward or radially inward respective coupling regions or are connected thereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A torsional vibration damper for incorporation into a torque transmission path between two components, said vibration damper comprising at least two disk-like damper members, each damper member having a radially outward coupling region and a radially inward coupling region, and at least one deformation region extending between the radially outward coupling region and the radially inward coupling region, each said deformation region being elastically deformable to permit a relative circumferential movement between the radially outward coupling region and the radially inward coupling region, at least one said radially inward coupling region and at least one said radially outward coupling region having tooth-like formations for mating with respective first and second components wherein the radially outward coupling region of one of said damper members mates with one of the two components, the radially inward coupling region of another of said damper members mates with the other of the two components, and the radially inward coupling region of the one damper member is connected to the radially outward coupling region of the another damper member via at least one further said damper member so that said damper members act in series for transmission of torque between said two components.

2. The torsional vibration damper as claimed in claim 1, wherein said at least one deformation region extends spirally between the radially outward coupling region and the radially inward coupling region.

3. The torsional vibration damper as claimed in claim 1, wherein at least two of the damper members are formed from different material.

4. The torsional vibration damper as claimed in claim 1, wherein at least two of the damper members are produced with different material dimensions.

5. The torsional vibration damper as claimed in claim 1, wherein at least two of the damper members are provided with different damping spring constants.

6. The torsional vibration damper as claimed in claim 1, wherein at least two of the damper members are provided in mutually opposite installation positions.

7. The torsional vibration damper as claimed in claim 1, wherein the damper members are arranged lying one upon the other.

8. The torsional vibration damper as claimed in claim 1, wherein the damper members are formed from spring steel material.

9. A hydrodynamic coupling device comprising a torsional vibration damper in a torque transmission path between a clutch member of a lockup clutch arrangement and a turbine wheel, said torsional vibration damper comprising at least two disk-like damper members, each damper member having a radially outward coupling region and a radially inward coupling region, and at least one deformation region extending between the radially outward coupling region and the radially inward coupling region, each said deformation region being elastically deformable to permit a relative circumferential movement between the radially outward coupling region and the radially inward coupling region, at least one of said radially inward coupling regions having tooth-like formations which mate with one of said clutch member and said turbine wheel, at least one of said radially outward coupling regions having tooth-like formations which mate with the other of said clutch member and said turbine wheel.

10. A hydrodynamic coupling device as in claim 9 wherein said tooth-like formations of said inward coupling regions mate with said turbine wheel, and said tooth-like formations of said outward coupling regions mate with said clutch member.

11. A hydrodynamic coupling device as in claim 9 wherein at least two of said disk-like members act in parallel for transmission of torque between said clutch member and said turbine wheel.

12. A hydrodynamic coupling device as in claim 9 wherein at least two of said disk-like members act in series for transmission of torque between said clutch member and said turbine wheel.

13. A hydrodynamic coupling device as in claim 9 wherein said at least one deformation region of each said disk-like damper member extends spirally between said radially inward coupling region and said radially outward coupling region.

14. A hydrodynamic coupling device comprising a torsional vibration damper in a torque transmission path between a turbine wheel shell and a turbine wheel hub, said torsional vibration damper comprising at least two disk-like damper members, each damper member having a radially outward coupling region and a radially inward coupling region, and at least one deformation region extending between the radially outward coupling region and the radially inward coupling region, each said deformation region being elastically deformable to permit a relative circumferential movement between the radially outward coupling region and the radially inward coupling region, at least one of said radially inward coupling regions having tooth-like formations which mate with said turbine wheel shell, at least one other of said radially inward coupling regions having tooth-like formations which mate with said turbine wheel hub, at least two of said radially outward coupling regions being directly connected so that said at least two of said disk-like damper members act in series for transmission of torque between said turbine wheel shell and said turbine wheel hub.

15. A hydrodynamic coupling device as in claim 14 wherein said at least one deformation region of each said disk-like damper member extends spirally between said radially inward coupling region and said radially outward coupling region.

* * * * *